UNITED STATES PATENT OFFICE.

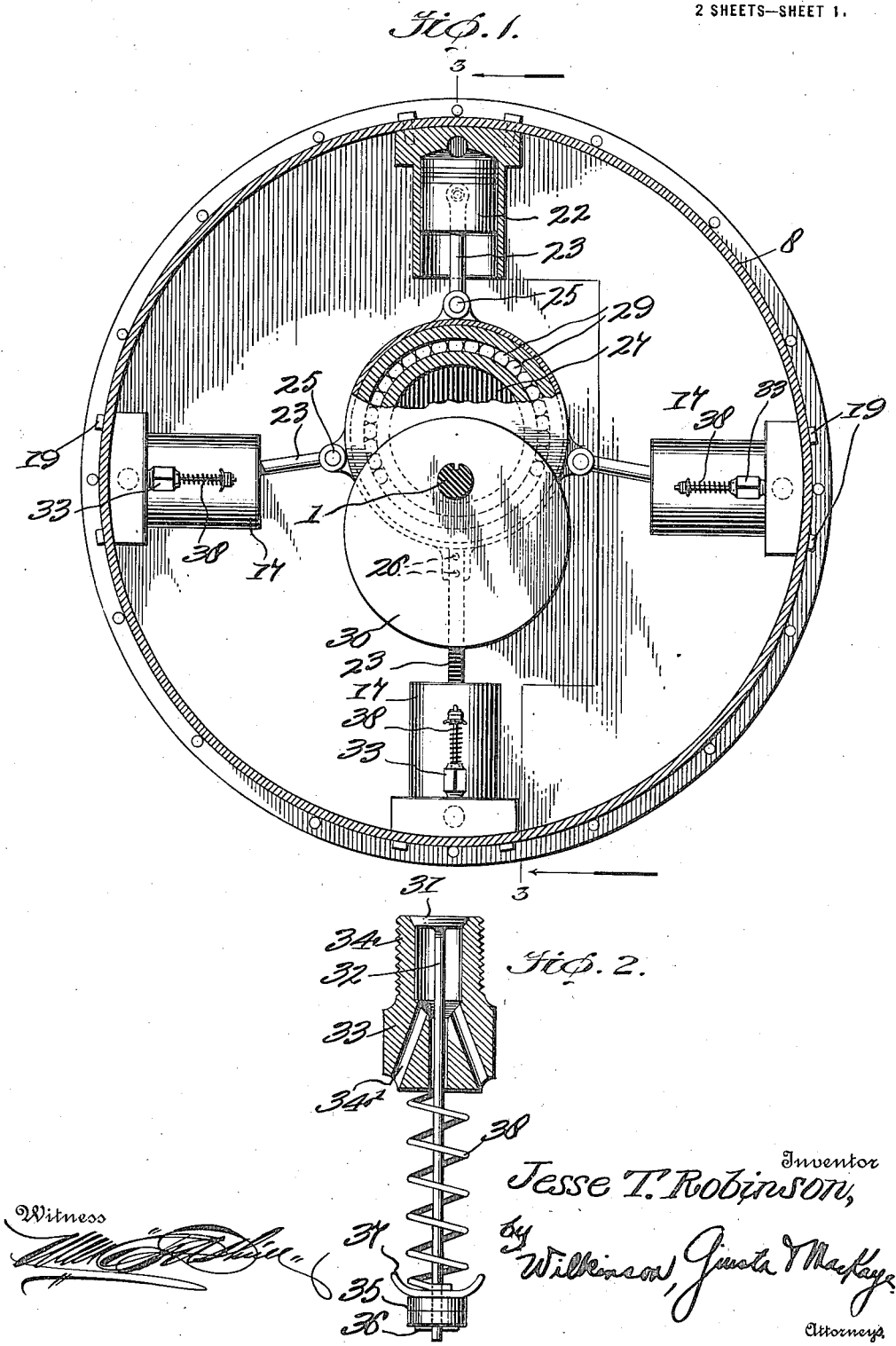

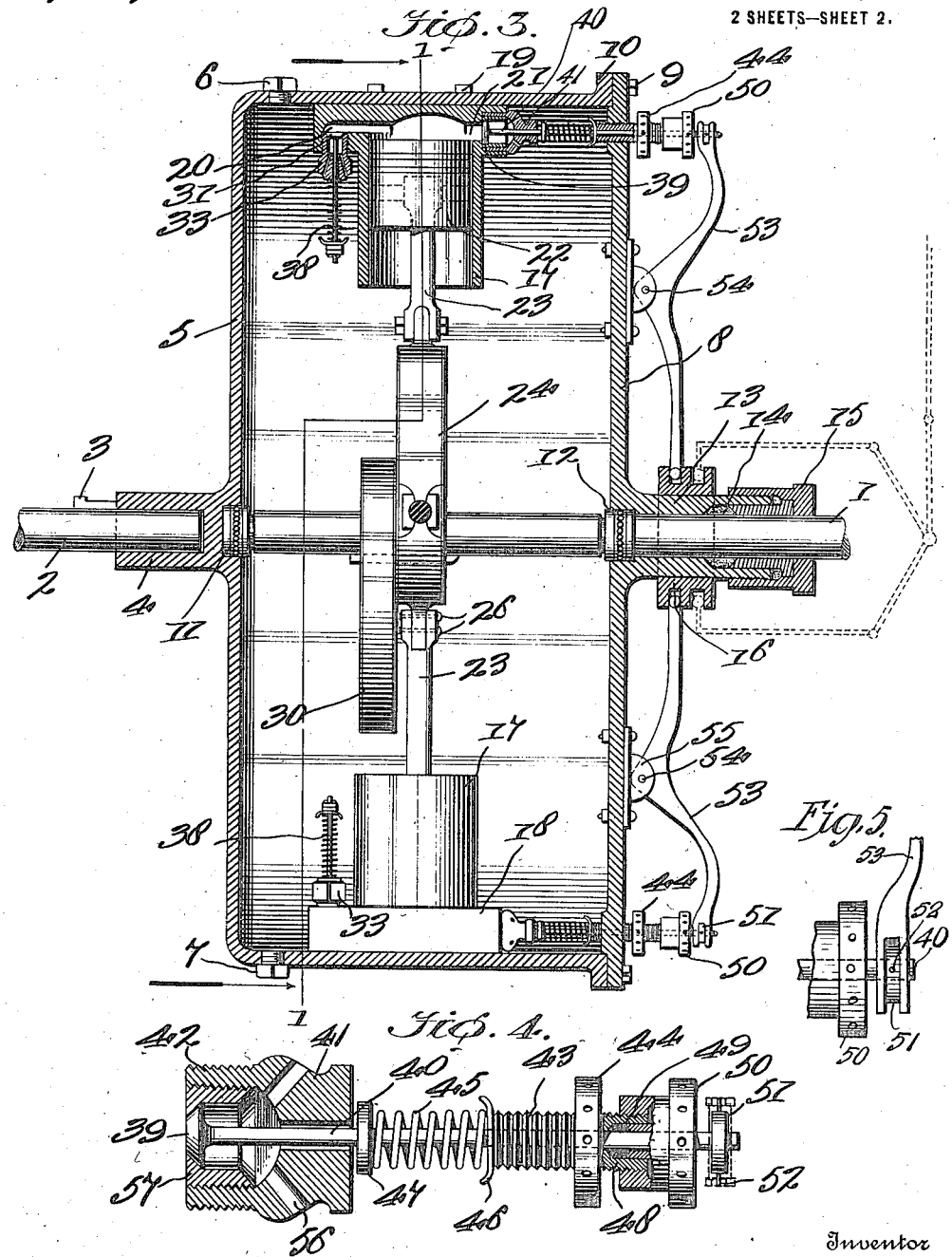

JESSE THOMAS ROBINSON, OF MONTGOMERY, ALABAMA, ASSIGNOR OF ONE-HALF TO W. H. WILLSON, OF BIRMINGHAM, ALABAMA.

VARIABLE-SPEED TRANSMISSION.

1,249,201.      Specification of Letters Patent.      Patented Dec. 4, 1917.

Application filed February 23, 1916. Serial No. 80,048.

*To all whom it may concern:*

Be it known that I, JESSE THOMAS ROBINSON, a citizen of the United States, residing at Montgomery, in the county of Montgomery and State of Alabama, have invented certain new and useful Improvements in Variable-Speed Transmissions; and I do hereby declare the following to be a full, clear, and exact description of the invention, such as will enable others skilled in the art to which it appertains to make and use the same.

My present invention relates to improvements in variable speed transmission, adaptable for use in connecting the crank and main shafts of automobiles and in connecting followers for variable speed transmission from their drivers in various other machines where smooth running is required, in which one or more cylinders are mounted to rotate with either the drive or driven shaft and containing movable pistons connected through a relatively movable coupling mechanism to be reciprocated from the other shaft when an exhaust valve is free to open and permit a substantially non-compressible fluid to be expelled from the cylinders as rapidly as drawn in; and it has for an object to modify, vary, and rearrange certain parts and mechanisms for rendering more practical devices of the above character, and which includes certain novel features, constructions and combinations which will be more fully hereinafter set out.

In the accompanying drawings forming a part of this application, and in which similar reference symbols indicate corresponding parts in the several views:

Figure 1 is a vertical sectional view of an improved variable speed transmission constructed in accordance with my present invention, and taken on the line 1—1 in Fig. 3, looking in the direction of the arrows.

Fig. 2 is an enlarged sectional view of the intake valve construction.

Fig. 3 is a transverse sectional view taken on the line 3—3 of Fig. 1;

Fig. 4 is an enlarged sectional detail view of the exhaust valve mechanism; and

Fig. 5 is an enlarged detail.

Referring now more particularly to the drawings, for advantages of description I have designated 1 as the drive and 2 the driven shafts, although it will be understood that the power source may be applied to either shaft without affecting the substantial operation of the invention, it being premised that the transmission mechanism connected between said shafts will be operative when driven from either side.

The driven shaft 2 is secured by a key 3, or other suitable means, in a socket 4 projecting centrally from the base of a cylindrical casing 5 into which a non-compressible fluid, such as oil preferably, is introduced through one or more removable plugs 6, 7, and which is wholly inclosed by a removable cover 8 secured as by bolts, or other means, 9 to a rim flange 10 thereon.

The drive shaft 1 is journaled centrally through said casing 5 and cover 8, as clearly appears from Fig. 3, there being preferably ball bearings 11 and 12, respectively, in the casing and cover to receive the drive shaft; the cover 8 being advantageously formed with a stuffing box 13 containing a packing 14 held in place by the gland 15 for securing a tight joint and preventing the leaking of oil or such non-compressible fluid as may be used through the drive shaft joint.

This stuffing box 13 also affords a bearing on which is slidably mounted a thrust block 16 operable through any suitable mechanism, of which one character is indicated in dotted lines, to limit the exhaust valves in a manner to be hereinafter more fully described.

Within the casing 5 and radially arranged about the drive shaft 1 as a center, are a series of cylinders 17 having heads or bases 18 secured by bolts, or other means, 19 to the cylindrical wall of the casing. Each head 18 is traversed by intake and exhaust passages 20, 21, for which see Fig. 3; and the cylinders 17 are fitted with pistons 22 for reciprocation therein. The pistons 22 are coupled by connecting rods 23 to a cam strap 24, three of the four of such connecting rods 23 shown in the drawings being coupled thereto by a pivotal connection 25, and the fourth rod being rigidly secured thereto as by a pair of rivets or bolts, indicated in dotted lines at 26 in Fig. 1.

The strap 24 is fitted over an eccentric 27, keyed or otherwise fixed to rotate with the drive shaft 1, there being disposed between said eccentric and strap races for receiving antifriction balls 29. To the eccentric 27 on shaft 1 is secured a counterweight 30 for balancing the eccentric and insuring smooth operation of the mechanism.

Fitted in projecting portions of the heads 18 of the cylinders 17, and in communication with the intake passages therein, are inlet valves 31 carried on stems 32 fitted for longitudinal movement in plugs 33 threaded, as indicated at 34 in Fig. 2, for detachable connection in said heads 18; the plugs being preferably radially disposed, as indicated in Figs. 1 and 3, in which case the fluid in the casing 5 being thrown outward by the centrifugal action will tend to more readily enter through the plugs 33 and unseat the valves 31, passing to the cylinders 17 through the intake passages 20, such fluid finding its way through ducts 34' in the bases of the plugs 33. The valve stems 32 project beyond the plugs 33, through which they are slidable, and receive on their outer ends nuts or washers 35 held in place by pins or other means 36 and confining plates 37 against which one end of coil or other springs 38 engage, the opposite ends of said springs 38 bearing against the outer ends of the plugs 33, and operating in a well understood manner to return the valves 31 to their seats when the pressure of the springs 38 exceeds the suction within the cylinders 17.

Similarly, the exhaust passages 21 in the heads 18 of the cylinders 17 are fitted with outlet valves 39 carried on stems 40 movable longitudinally through valve casings 41 threaded at 42, as indicated in Fig. 4, for detachable fitting in said heads 18, said valves and casings being advantageously transversely arranged, as will appear more particularly from Fig. 3; the valve stems 40 extending to the exterior through the cover plate 8 and passing through sleeves 43 threaded into said cover; such sleeves being provided with perforated heads 44 for engagement by a tool to revolve the same and adjust the tension of coil or other springs 45, confined between plates 46 and washers 47 abutting respectively against the threaded sleeves 43 and the outer ends of the valve casings 41.

The exterior ends of the threaded sleeves 43 are formed into stuffing boxes 48 receiving packing 49 held in place by glands 50, perforated similar to the heads 44, for receiving a tool to revolve the same and tighten the packing from time to time, as it may become necessary. The valve stems 40 are freely slidable through the sleeves 43 and stuffing boxes 48, and are provided on their outer ends with couplings 51 carrying pins or other means 52, about which pins 52 are loosely arranged the bifurcated ends of bent levers 53 fulcrumed, as indicated at 54, in ears 55 secured to the cover 8 of the casing. Such levers 53 have their inner ends loosely fitted in the thrust block 16, and are operable therethrough to maintain closed or limit the opening movement of the exhaust valves 39.

In the exhaust valve casings 41 are one or more ducts 56 communicating with the interior of the casing 5, and such casings, if desirable, are provided with detachable valve seats 57 which may be removed and replaced as the same become worn.

In the operation of the improved transmission, the shaft 1, which is the drive shaft in the present instance, is revolved at substantially constant speed, and carrying with it the eccentric 27 will, through the strap 24, reciprocate the several pistons 22 in their cylinders 17. Such pistons 22 will, on their inward movement, draw in through the inlet valves 31, a charge of the non-compressible fluid such as oil, and on their outward movement will expel such charge through the exhaust valves 39 and ducts 56 in the valve casings 41 back into the casing 5 to be subsequently utilized. It is of advantage to use some such non-compressible fluid as lubricating oil, as the same will lubricate and keep the various parts in proper working order in addition to functioning as the transmission medium.

When the charge of fluid is thus free to be expelled through the exhaust valves 39, the pistons will freely reciprocate in the cylinders 17 as the drive shaft 1 rotates, and no movement will be imparted through the transmission mechanism to the casing 5 nor to the driven shaft 2. The exhaust valves 39 are thus free to open only in opposition to the pressure of their coil springs 45, which will immediately return the valves to their seats when the pressure has been relieved and when the pistons 22 start on their inward movement. This free movement of the exhaust valve is permitted by virtue of the loose connection between the levers 53 and valve stems 40.

The driven shaft 2 and casing 5 are connected to rotate at the same speed with the drive shaft 1 by maintaining the exhaust valves 39 closed, in which case the charge of non-compressible fluid having been drawn in through the intake valves 31 may not be expelled through the exhaust valves 39 and the pistons 22, therefore being held against travel in their cylinders 17, the strap 24 will be locked to rotate with the eccentric 27 and the transmission of movement from drive to driven shaft will be effected.

The exhaust valves 39 are held securely to their seats 57 by means of the levers 53 controlled through the thrust block 16 and its actuating mechanism. Through this mechanism also the exhaust valves 39 may have a limited movement permitting only slow expulsion of the charge of the non-compressible fluid from the cylinder 17 as the pistons 22 travel outward, and it will be seen that in accordance with the rapidity with which the charge may be expelled, so the speed at which the shaft 2 is driven may be regulated.

I am aware that fluid clutches and hydraulic transmissions of the type enumerated in the opening paragraph of the present specification, are well known in this art, and I lay no claim to such devices broadly; however, I do not desire to be restricted to details of construction and combination of parts except as may be required by the appended claims.

I claim:

1. In combination, a drive element and a driven element, a fluid-containing casing connected to rotate with one of said elements, a cylinder attached to the interior of said casing and rotating therewith, a piston traveling in said cylinder and coupled to the other element, an intake valve for said cylinder, an exhaust valve for said cylinder, a stem carrying said exhaust valve, a coupling carried on said stem, and a lever having one end loosely engaging said coupling to regulate the opening movement of said exhaust valve, substantially as described.

2. In combination, drive and driven elements, a fluid-containing casing secured to rotate with one of said elements, a cylinder within said casing and fixed to rotate therewith, a piston traveling in said cylinder and coupled to the other of said elements, an intake valve for said cylinder, an exhaust valve for said cylinder, a stem connected to said exhaust valve, a coupling secured to said valve stem, pins projecting from said coupling, a lever having bifurcated ends loosely engaging over said coupling pins and adapted to regulate the opening movement of said exhaust valve, substantially as described.

3. In combination, drive and driven elements, a fluid-containing casing secured to rotate with one of said elements, a series of radially arranged cylinders within said casing and secured to rotate therewith, pistons traveling in said cylinders, connecting rods coupled to said pistons, a cam strap to which said connecting rods are coupled, a cam on the other of said elements receiving said cam strap, a counterweight associated with said cam, radially opening intake valves for each of said cylinders, transversely opening exhaust valves for said cylinders, stems carrying said exhaust valves and projecting through said casing, spring means for returning the exhaust valves to their respective seats, couplings on said exhaust valve stems, pins on said couplings, a series of levers fulcrumed on said casing and having bifurcated ends loosely engaging over the pins on said couplings for permitting the exhaust valves to open but limiting such opening movement, and means for simultaneously moving said levers to regulate the exhaust valves, substantially as described.

In testimony whereof, I affix my signature.

JESSE THOMAS ROBINSON.